United States Patent [19]
Atake

[11] Patent Number: 5,269,142
[45] Date of Patent: Dec. 14, 1993

[54] DIFFERENTIAL ROTATION CONTROL DEVICE WITH A HYDRAULIC ASSEMBLY

[76] Inventor: Minoru Atake, 579-6, Ohioso, Ohioso-Machi, Kanagawa-Ken, Japan

[21] Appl. No.: 964,250

[22] Filed: Oct. 21, 1992

Related U.S. Application Data

[63] Continuation-in-part of Ser. No. 482,205, Feb. 20, 1990, abandoned.

[30] Foreign Application Priority Data

Feb. 22, 1989 [JP] Japan ............................. 1-42836
Feb. 22, 1989 [JP] Japan ............................. 1-42837

[51] Int. Cl.$^5$ ..................... F16D 31/02; F16D 39/00
[52] U.S. Cl. ......................................... 60/484; 60/485; 60/487; 91/505; 92/12.2; 92/57; 92/71; 417/269; 417/222.1
[58] Field of Search ............... 60/484, 485, 486, 487, 60/489; 417/269, 222 R, 222 S; 91/499, 504, 505; 92/12.2, 57, 71

[56] References Cited

U.S. PATENT DOCUMENTS

| | | | |
|---|---|---|---|
| 1,227,055 | 5/1917 | Kellogg | 60/485 |
| 3,065,700 | 11/1962 | Blenkle | 60/487 |
| 3,123,975 | 3/1964 | Ebert | 60/486 |
| 3,209,538 | 10/1965 | Kuze | 60/485 |
| 3,430,438 | 3/1969 | Weiss | 60/485 |
| 3,888,083 | 6/1975 | Tone | 60/487 |
| 3,916,625 | 11/1975 | Holtkamp | 60/486 |
| 3,972,188 | 8/1976 | Jessee | 60/486 X |
| 4,813,234 | 3/1989 | Nikolaus | 60/486 |
| 4,918,918 | 4/1990 | Miki et al. | 60/489 |
| 5,070,696 | 12/1991 | Atake | 91/505 X |

FOREIGN PATENT DOCUMENTS

| | | | |
|---|---|---|---|
| 650894 | 10/1962 | Canada | 60/485 |
| 427956 | 5/1935 | United Kingdom | 60/486 |

Primary Examiner—Edward K. Look
Assistant Examiner—Hoang Nguyen
Attorney, Agent, or Firm—Frishauf, Holtz, Goodman & Woodward

[57] ABSTRACT

A differential rotation control device with a hydraulic assembly includes two torque transmission assemblies. Each assembly has a first rotor with a pump-driven arrangement secured to a drive shaft which is common to both of the torque transmission assemblies, and a second rotor with a torque-receiving arrangement rotatably supported on the drive shaft. The torque-receiving arrangement is rotated when hydraulic power is applied to the pump-driven arrangement so that the rotation speed ratio between the first and second rotors can be variably set. The two pump assemblies each have a pump-driving arrangement assembled to the first rotor for constituting a circular route together with the pump-driven arrangement for circulating fluid. A pump-regulating arrangement controls fluid supplied to the pump-driven arrangement when the drive shaft is rotated relative to a pump-stator to which the pump-regulating arrangement is secured. A differential rotation control device applies different control ratio between the fluid amounts supplied to the pump-regulating arrangement of the pump assemblies.

2 Claims, 6 Drawing Sheets

DIFFERENTIAL ROTATION CONTROL DEVICE WITH A HYDRAULIC ASSEMBLY

This application is a continuation in part application of U.S. Ser. No. 07/482,205, filed Feb. 20, 1990, now abandoned.

FIELD OF THE INVENTION

This invention relates to a differential rotation control device for use with a hydraulic assembly and, more particularly, to a differential rotation control device mainly adapted to a differential rotation arrangement or a torque split arrangement used for cars, trucks and the like.

BACKGROUND OF THE INVENTION

A differential gear device used for cars is well known in the prior art as an essential part of the car construction, wherein the differential gear device automatically operates according to the difference between both loads of the left and right driving wheels. However, the differential rate of the device is not adjustable to the varied driving modes and is set on a static condition because of its geared mechanism.

Therefore, in order to maintain a straight driving mode at a high speed, for instance, means for a differential lock may be further included for car construction. Generally, a transmission system for a car includes a complicated oil-control system capable of adjusting the differential rate corresponding to the varied driving modes.

A differential gear device is also used for a car having four driving wheels in order to distribute torque to the front and rear wheels with the aid of an oil-control system adapted to control the torque distributing rate according to the driving mode.

Namely, the car construction including said differential gear device must use an expensive, sophisticated and complicated control system to adjust the differential rate or the torque distributing rate.

A differential rotation control device with a hydraulic assembly is disclosed in U.S. Pat. No. 3,065,700. Such differential rotation control device can be controlled so as to regulate fluid flow between hydrostatic pumps and hydrostatic motors by means for varying inclinations of a pair of swash plates, but it operates with a low efficiency. If this device is applied to a car drive control, when it is driven so as to transmit the most torque power in a small reduction ratio, the pump assemblies must be driven under the highest rotation speed. This causes a significant consumption of energy for pumping fluid at its highest delivery amount and, as a result, lowers the torque transmission efficiency. This is a significant disadvantage of such a prior art device.

SUMMARY OF THE INVENTION

An object of this invention is to provide a differential rotation control device with a hydraulic assembly capable of adjusting a differential rate or torque distributing rate and having a relatively simple construction with means for controlling pressurized oil of an hydraulic variable transmission system, such as a torque transmission device described in U.S. Pat. No. 5,070,696, operating with a high efficiency for torque transmission.

This and other objects of the present invention are accomplished in accordance with one aspect of the present invention directed to a differential rotation control device with a hydraulic assembly including a drive shaft, and two torque transmission assemblies each having a first rotor with pump-driven means. The first rotor is secured to the drive shaft. A second rotor with torque-receiving means is supported on and rotatable relative to the drive shaft. The torque-receiving means is engaged with and rotated by the pump-driven means when hydraulic power is applied thereto so that a rotation speed ratio between the first and second rotors can be variably set. Two pump assemblies each have a pump-driving means coupled to the first rotor for forming a circular fluid route together with the pump-driven means, and a pump-regulating means controls an amount of fluid supplied to the pump-driven means when the drive shaft is rotated relative to a pump-stator to which the pump-regulating means is secured. A means is provided for selectively applying different control ratios between the amount of fluid supplied by the pump-regulating means of the two pump assemblies.

Another aspect of the present invention is directed to a differential rotation control device with a hydraulic assembly including two torque transmission assemblies respectively including first rotors with means driven by a pump and second rotors with means for receiving torque power from the first rotors when hydraulic power is applied to the pump-driven means. The first rotors are fixed on a common shaft and the second rotors are mounted on and rotatable relative to the common shaft, the common shaft being a power input shaft and the second rotors being power output members, and the second rotors having rotor inlet ports receiving fluid to be pumped and rotor outlet ports discharging pumped fluid, respectively. Two pump assemblies, corresponding respectively to the two torque transmission assemblies, each include pump rotors with means driven by pump-driving means for pumping the pump-driven means, the pump rotors being fixed to the common shaft, and the pump-driving means regulate a delivery amount of fluid to be pumped as the pump rotors are rotated. Two fluid circulation routes respectively include pump inlet ports and pump outlet ports through which the respective pumps of the pump assemblies communicate with the corresponding pump-driven means of the respective torque transmission assemblies. A means is provided for regulating fluid supplied to the pump-driven means when the drive shaft is rotated relative to a pump-stator to which the pump-driving means is secured, and a control means applies different control ratios between the amount of fluid supplied to the pump-driving means of the pump assemblies.

Other features and advantages of this invention will be apparent from the description provided below taken together with the accompanying drawings.

DETAILED DESCRIPTION OF THE INVENTION

A differential rotation control device with a hydraulic assembly is illustrated in FIGS. 1 to 10. In this first embodiment, the device comprises two torque transmission assemblies 6A and 6B which are adapted to transmit the torque power from a common drive shaft 5 to, for example, the left and right driving wheels of a car, respectively. The shaft 5 is journalled in bearings 3 and 4 mounted on both side frames 1 and 2.

The torque transmission assemblies 6A and 6B include first respective rotors 7A and 7B with pump-driven means (discussed in detail below) and second respective rotors 8A and 8B with torque receiving means (discussed in detail below). The first rotors 7A and 7B are rigidly supported to the shaft 5 by means of key members 9A and 9B, respectively, and the second rotors 8A and 8B are rotatably supported on shaft 5 in order to receive torque power from the first rotors, respectively, when each of the pump-driven means is pumped. In order to prevent any axial movement of the second rotors, they are respectively disposed between the first rotors 7A and 7B and thrust bearings 10 which are supported on metal rings 9 attached to the shaft 5 by means of screw nuts 5a threaded to the shaft 5.

Figure 4:
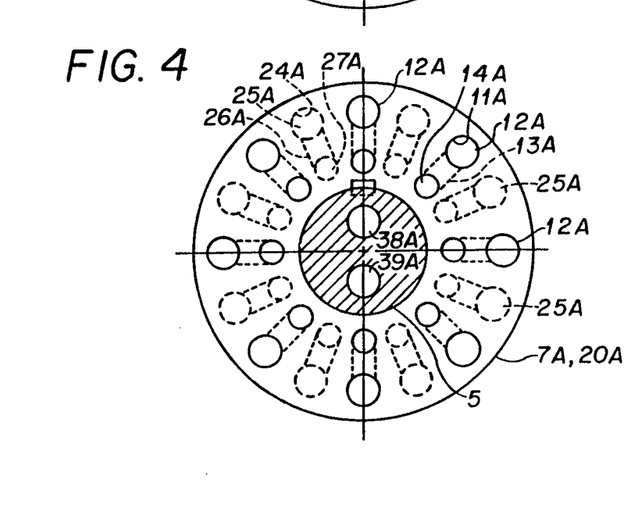
Figure 5:
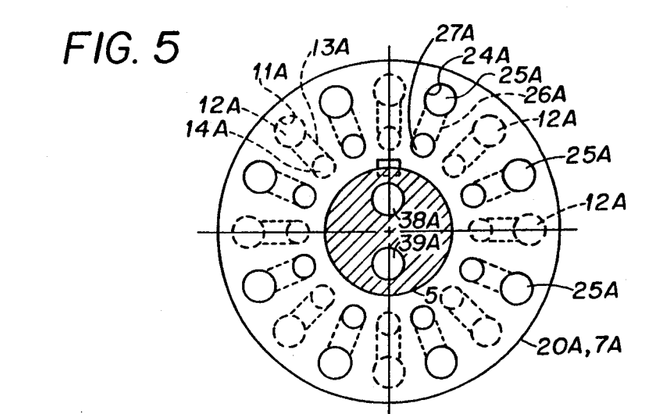

The pump-driven means of the first rotor 7A [7B] includes a plurality of cylinder bores 11A [11B] equally spaced around the rotor axis and open to one end of the rotor 7A [7B]. Plunger members 12A [12B] are slidably inserted into the respective open ends of cylinder bores 11A [11B]. Preferably, the plunger members 12A [12B] and cylinder bores 11A [11B] are mutually oil-sealed. The cylinder bores 11A [11B] are respectively communicated through a plurality of radially extending passages 13A [13B] with a plurality of ports 14A [14B] open to the surface of the second rotor 8A [8B] on a prescribed pitch circle smaller than that of the bores 11A [11B], as shown in FIG. 4.

The torque receiving means of the second rotor 8A [8B] has a swash plate 16A [16B] with a driving surface 15A [15B] inclined at a certain angle to the axis of shaft 5 and positioned so as to engage and guide the outer ends of the plunger members 12A [2B]. Swash plate 16A [16B] is rotatably supported on the inclined surface of the second rotor 8A [8B], which surface is parallel to the inclined surface 15A [15B]. The second rotor 8A [8B] further includes two semi-circular ports 17A [17B] and 18A [18B], shown in FIG. 3 [FIG. 10], used as an inlet port and an outlet port. The semi-circular ports 17A [17B] and 18A [18B] are disposed at the end surface of the second rotor 8A [8B]. The end surface of the second rotor 8A [8B] is positioned adjacent to the inclined surface of the swash plate 16A [16B].

The differential rotation control device further comprises two pump assemblies 19A and 19B for controlling a relative rotation speed rate between the first and second rotors of the corresponding torque transmission assemblies 6A and 6B. In this embodiment, the pump assembly 6A [6B] includes a pump-driving means (described in detail below) assembled on a pump rotor 20A [20B] and a pump stator 21 mounted to or integrally formed on the frame of the device in a manner such as to face the pump-driving means in the axial direction of the shaft 5. In this embodiment, the pump rotor 20A [20B] is integrally formed on the first rotor 7A [7B], and the stator 21 surrounds the central portion of the shaft 5. The pump-driving means includes a plurality of cylinder bores 24A [24B] open to the other end of the first rotor 7A [7B]. Thus, bores 11A [11B] and 24A [24B] open in opposite directions. Plunger members 25A [25B] are slidably inserted into cylinder bores 24A [24B]. The cylinder bores 24A [24B] are equally spaced around the axis of rotor 7A [7B] and arranged to a prescribed pitch circle co-axial to the rotation of the shaft 5. Cylinder bores 24A [24B] are disposed alternately with the cylinder bores 11A [11B], as shown in FIGS. 4, 5, 8 and 9. If necessary, oil-seal means may be adapted to slide between each of said plunger members and cylinder bores. The cylinder bores 24A [24B] are individually communicated through radially extending passages 26A [26B] with a plurality of ports 27A [27B] open to one end of the pump rotor 20A [20B] so as to be equally spaced to a prescribed pitch circle smaller than that of the cylinder bores 24A [24B] and facing the pump stator 21.

Figure 6:
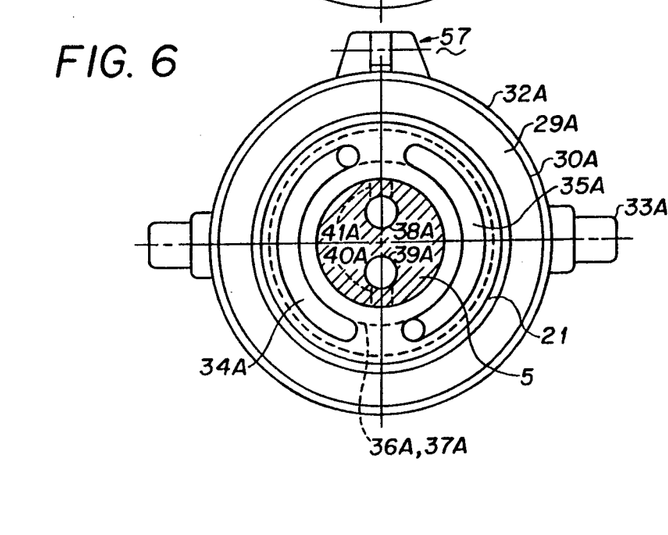
Figure 7:
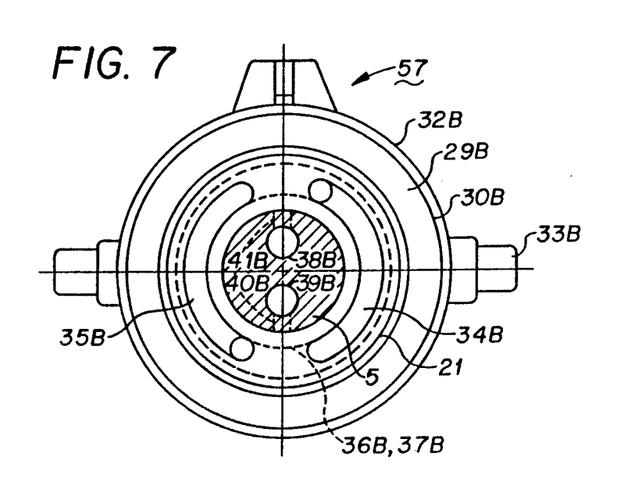
Figure 8:
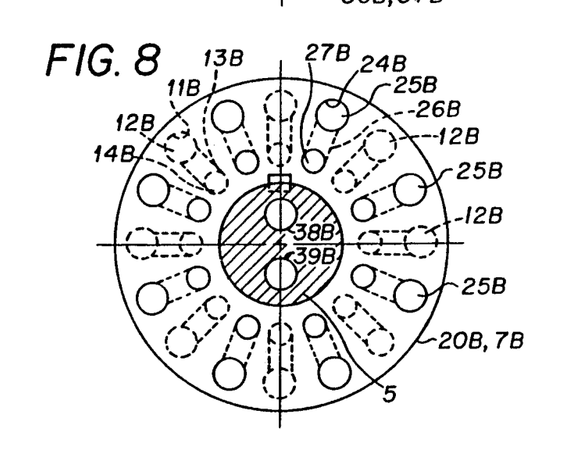
Figure 9:
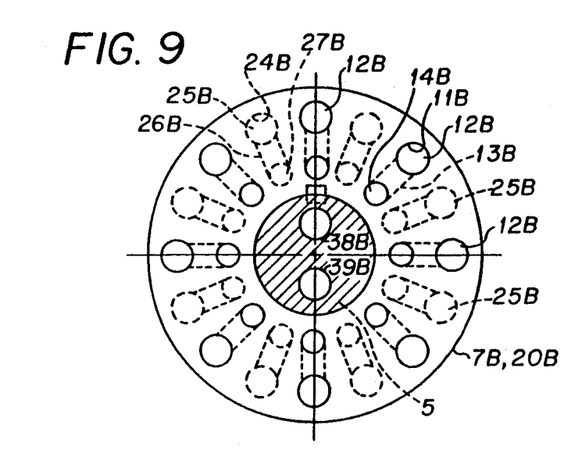
Figure 10:
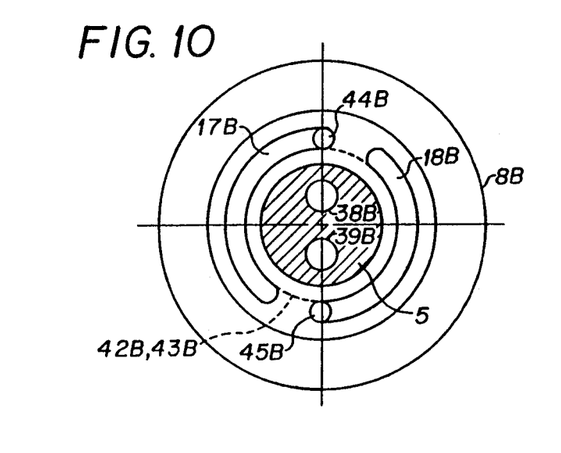

The pump assembly 19A [19B] in this embodiment further includes a swash plate 30A [30B] with a driving surface 29A [29B] adjustably inclined to the axis of the shaft 5, and a supporting plate 32A [32B] having a thrust bearing 31A [31B] through which the swash plate 30A [30B] is rotatably supported thereto. A pair of projections 33A [33B] are perpendicular to the axis of the shaft 5 and form an axis so as to rotatably couple the supporting plate 32A [32B] to the stator 21. Furthermore, pump stator 21 includes pump ports 34A [34B] and 35A [35B] which are shown in FIGS. 6 and 7 as being semi-circular shape, and these ports face the ports 27A [27B] of pump rotor 20A [20B].

The pump ports 34A [34B] and 35A [35B] are individually communicated with annular passages 36A [36B] and 37A [37B] formed in inner surfaces of the pump stator 21 surrounding the shaft 5, respectively, and communicated with axial passages 38A [38B] and 39A [39B] formed in the shaft 5 through radially extending passages 41A [41B] and 40A [40B]. The passages 38A [38B] and 39A [39B] are communicated with annular passages 42A [42B] and 43A [43B] formed to inner surfaces of the second rotor 8A [8B] surrounding the shaft 5. The annular passages 42A [42B] and 43A [43B] are communicated with the half circular ports 17A [17B] and 18A [18B] of the corresponding rotor 8A [8B] through passages 44A [44B] and 45A [45B].

Accordingly, the device has two circular routes corresponding to the torque transmission means and pump assemblies respectively. In particular, one of the circular routes consists of the cylinder bores 11A and 24A, half circular ports 17A, 18A, 34A and 35A, ports 14A and 27A, and passages 13A, 26A, and 36A to 45A, and the other consists of the cylinder bores 11B and 24B, half circular ports 17B, 18B, 34B and 35B, ports 14B and 27B, and passages 13B, 26B, and 36B to 45B.

With the pump ports 34A [34B] and 35A [35B] are individually communicated check valves 46A [46B] and 47A [47B] through passages 48A [48B] and 49A [49B]. An oil pump 50 is adapted to supply pressurized fluid to each of the check valves, and the suction port of the oil pump 50 is communicated with an oil tank 51 and the delivery port thereof is communicated with the oil tank 51 through the bypass of a pressure regulating valve 52 with its oil pressure being adjusted by means of control system 53.

Fluid which leaks out from any portions of the differential rotation control device, such as ports and passages, is routed to an oil pan 54 and returned to the oil tank 51.

Figure 1:
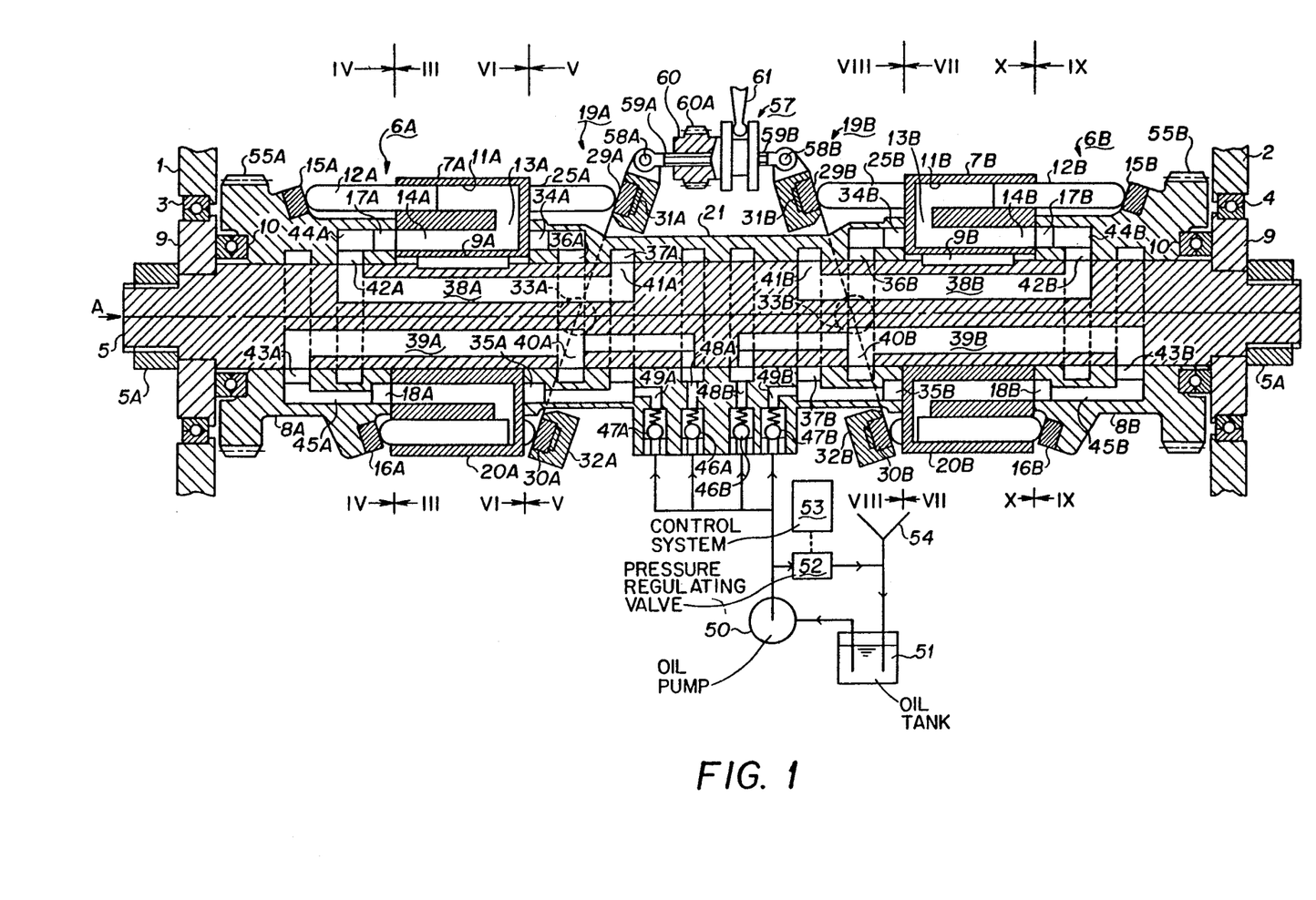
FIG. 1 is a vertical cross section of a differential rotation control device embodying this invention.
Figure 2:
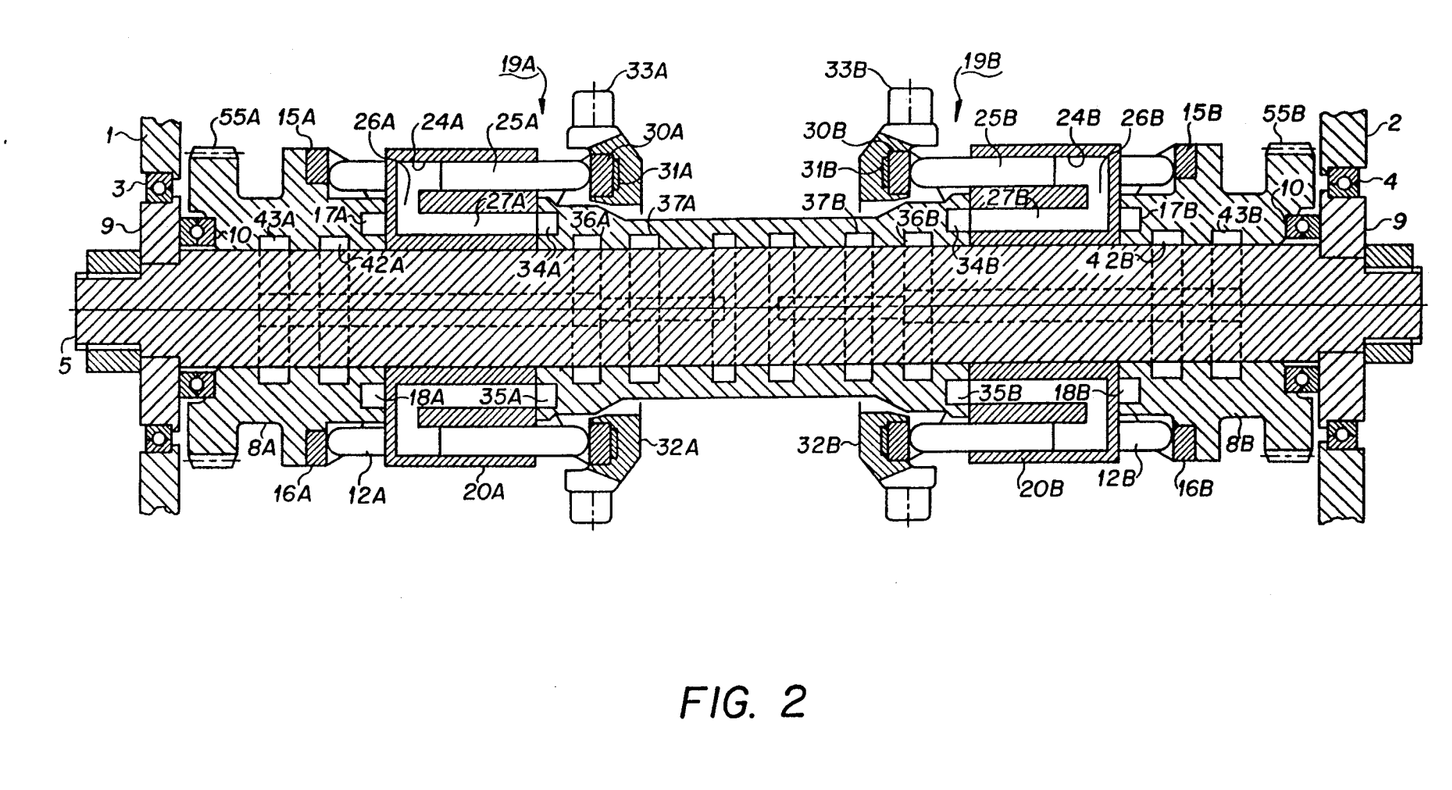
FIG. 2 is a horizontal cross section of the device illustrated in FIG. 1.
Figure 3:
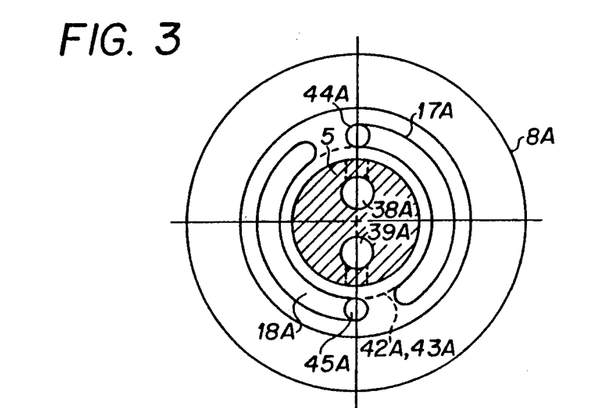
FIGS. 3 to 10 are cross-sectional views along lines III—III to X—X, respectively, shown in FIG. 1.

Input power for rotating the shaft 5 is illustrated in FIG. 1 by "P". The output power of the differential rotation speed control device is delivered by output gears 55A and 55B secured to the second rotors 8A and 8B, respectively.

The differential rotation speed control device further includes a means which is part of the pump assemblies 19A and 19B for regulating fluid delivery per rotation. The regulating means in this embodiment is constructed of a turn-buckle assembly 57 that includes two rods 59A and 59B which are respectively externally threaded in reverse directions relative to each other. The rods are pivoted to the supporting plates 32A and 32B by means of pivot pins 58A and 58B, respectively. An internally threaded control member 60 is rotatably screwed onto both rods. The control member 60 has a gear tooth 60A which meshes with a driving gear included as part of a control system (not shown). When the control member 60 is rotatably adjusted, both of the supporting plates 32A and 32B are simultaneously inclined around axes 33A [33B] in reverse rotating directions to form the same but opposite acute angles with the axis of shaft 5. Thus, rotation of control member 60 sets the angle of inclination for plates 32A and 32B.

The control member 60 can be operated in the lengthwise direction of the rods by means of a shifter 61 which is driven by a differential control system [not shown]. Consequently, when the control member 60 is shifted in the lengthwise direction of the rods, both of the supporting plates 32A and 32B are rotated around their axes to form different acute angles with the axis of shaft 5.

Torque power is transmitted to the first rotors 7A and 7B [and pump rotors 20A and 20B] via the shaft 5. When fluid such as oil under pressure completely fills the cylinder bores 11A, 11B and 24A, 24B, and the passages in communication with the bores, and the oil pump 50 is driven so as to maintain the pressure of the bores and passages to a prescribed value determined by the pressure control valve 52, torque power with a corresponding rate of rotation is transmitted from the first rotors 7A and 7B to the second rotors 8A and 8B, respectively. Thus, in the respective torque transmission means and the corresponding pump assembly, as the first rotor 7A [7B] is rotated for a rotation speed RA [RB], the second rotor 8A [8B] is rotated for a rotation speed rA [rB] due to the angle of the driving surface 15A [15B] thereby to transmit a torque from the rotor 7A [7B] to rotor 8A [8B] at a speed ratio a=rA/RA [b=rB/RB] and to output the torque power through the gear 55A [55B].

A reason for obtaining such a speed ratio a=rA/RA [b=rB/RB] is as explained below.

It is considered that the respective rotation speed RA and rA [rB and RB] of the first and second rotors 7A [7B] and 8A [8B] produce a pump delivery volume QA [QB]. Suppose that the first rotor 7A [7B] is rotated in a clockwise direction in FIG. 5 [FIG. 9], the plunger members 12A [12B] are pushed by the driving surface 15A [15B] so as to obtain the pump delivery volume QA=Qx [QB=Qy] in the pump port 17A [17B] and the pump suction volume QA'=QA [QB'=QB] in the pump port 18A [18B].

In this case, under a condition where the shifter 61 is settled in a neutral position as shown in FIG. 1, the speed rA is controlled by the inclination of the swash plate 30A [30B] produced by rotating the control member 60, so that the speed ratio a=rA/RA is varied because the interrelation between the pump delivery volume in the pump ports 17A [17B] and pump suction volume in the pump ports 18A [18B] is maintained absolutely as QA=QA' under the condition that the respective circular routes are independently completed. For example, if it is assumed that the second rotor 8A [8B] is rotated in the same direction as the first rotor 7A [7B] for a rotating speed rA [rB], the differential speed between the first and second rotors 7A [7B] and 8A [8B] is RA−rA [RB−rB], and the pump delivery volume QA [QB] is;

$$QA = Qx * (RA-rA)/RA \qquad (1)$$

$$[QB = Qy * (RB-rB)/RB \qquad (1')]$$

And similarly, the suction volume QA' [QB'] in the pump port 18A [18B] is;

$$QA' = QA = Qx * (RA-rA)/RA \qquad (2)$$

$$[QB' = aB = Qy * (RB-rB)/RB \qquad (2')]$$

In this case, k and k' are coefficients defined as $k = (RA-rA)/RA$ and $k' = (RB-rB)/RB$. If the driving surface 29A [29B] is controlled so as to be inclined perpendicularly to the axis of shaft 5, the plunger members 25A [25B] cannot advance and retract because the plunger members 25A [25B] are restricted with their pumping motion to follow the driving surface 29A [29B]. Accordingly, oil in the respective route is choked so as to stop the motion of the plunger members 12A [12B] and, thus, to maintain the plunger members 12A [12B] immovable. Consequently, when the first rotor 7A [7B] is rotated at a speed RA [RB] and the pump rotor 20A [20B] is integrally rotated therewith, the second rotor 8A [8B] is rotated at the same speed rA=RA (rB=RB), because QA=QA'=QX * (RA−rA)/RA=0 and QB'=QB=Qy * (RB−rB)/RB=0, i.e., k=0 and k'=0 which means a no pumping condition exists in the respective route.

If the swash place 30A [30B] is controlled so that the driving surface 29A [29B] is inclined under a condition where the plunger members 25A [25B] supply the suction volume for one rotation of the first rotor 7A [7B] and the pumping volume is the same volume as that which the plunger members 12A [12B] supply for one rotation of the first rotor 7A [7B], the rotating torque cannot be transmitted from the first rotor 7A [7B] to the second rotor 8A [8B]. In other words, if rA [rB] is zero, QA=QA'=QX and QB=QB'=Qy, i.e., k=1 and k'=1 which means that all of the torque power applied to the first rotor 7A [7B] is expended only to pumping power.

For practical use, the inclination of swash plate 30A [30B] may be controlled within a range of $0<k<1$ $[0<k'<1]$ and $k=1$ $[k'=1]$ without use of a reverse-gear operation which utilizes a range of $k<1$ $[k'<1]$, and use of an over-drive operation which utilizes a range of $k<0$ $[k'<0]$.

It should be readily understood from the above-provided description that the rotating operation of the control member 60 simultaneously controls both second rotors 8A and 8B to operate at the same rotating speed in this embodiment if the shifter 61 is settled at the neutral position. Under such condition, the driving surfaces 29A and 29B are maintained at the same angles, and the coefficiency is $k=k'$. The advantage of this torque transmission device is to keep a high torque transmission efficiency under a condition of $k=1$ $[k'=1]$.

In order to cause a differential rotation to be applied to the output gears 55A and 55B of the torque transmission assemblies 6A and 6B, the shifter 61 is shifted in the lengthwise direction of the rods 59A and 59B (left or right in FIG. 1) so as to move the rods together with the control member 60, whereby the supporting plates 32A and 32B are inclined to different angles with either one of the inclinations of the driving surfaces 29A and 29B being increased and the other being decreased. In this case, the coefficients are $k>k'$ or $k<k'$. Accordingly, the speed ratio of one of the torque transmission assemblies is increased and the speed ratio of the other is decreased so as to generate a differential operation between the output gears 55A and 55B.

In case the shifter is linked to the steering operation for driving such a tractor, snowmobile, war tank and the like, the differential rotation speed control device of this invention can apply a differential operation between both side driving wheels of such vehicle which are interconnected with the output gears 55A and 55B.

Consequently, the control device of this invention can be used as a composite device of a relatively simple construction for (a) applying a speed control to a vehicle, by controlling the angle of inclination of the plates to be equal but opposite for both torque transmission assemblies, and (b) controlling the differential rotation between both side driving wheels of the vehicle by having different such angles of inclination.

Figures 11, 11A:
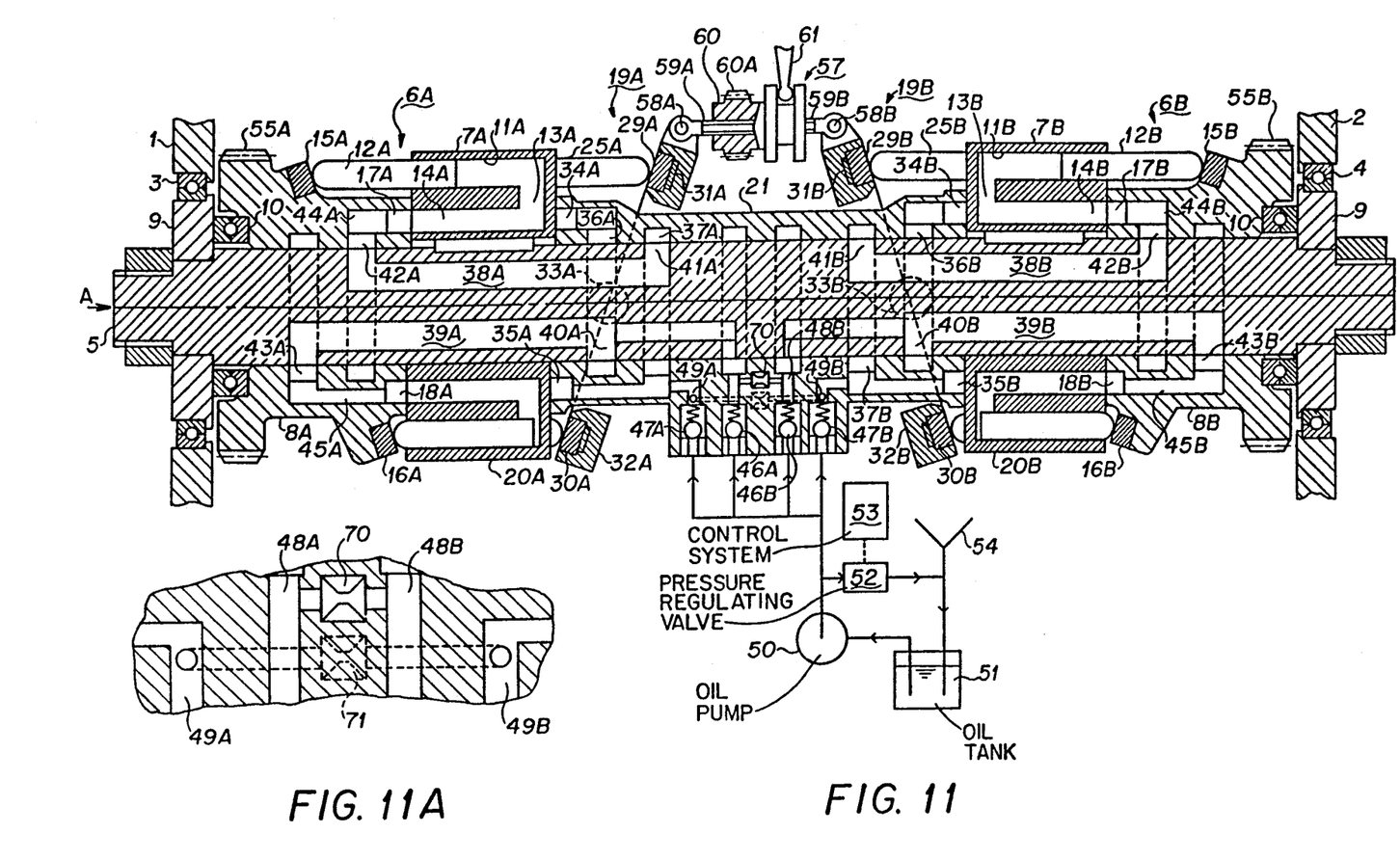
FIG. 11 is a vertical cross section of a differential rotation control device according to a second embodiment of the invention.
FIG. 11A shows an enlarged portion of FIG. 11.

A second embodiment of this invention is illustrated in FIG. 11. The driving operation of the torque transmission assemblies, pump assemblies, and regulating means in this embodiment is substantially identical to that of the first embodiment, as described above. In this embodiment, there are provided two orifices 70 and 71 formed in the interior of the pump stator 21. Orifice 70 communicates passage 48A with passage 48B between passages 39A and 39B, and orifice 71 communicates passage 49A with passage 49B between passages 38A and 38B. Accordingly, if the differential control device of this invention is used for a vehicle, the steering operation overcomes bad road conditions, particularly as the vehicle moves in a straight line or in a constant curved line. More specifically, if both oil routes are mutually independent as illustrated in the first embodiment, when an abnormal load due, for example, to a rough road condition occurs, a large tracking load is applied to either one of the driving wheels associated with the second rotors 8A and 8B as the other driving wheel slips. The different resisting powers are applied to the swash plates 30A and 30B through the oil routes individually, thereby causing the shifter 61 together with the control member 60 to be forced to one side or the other in its shifting direction. In this case, in order to maintain motion of the vehicle in a straight line or in a constant curved line, the driver must control the steering wheel so as to secure the shifter 61 in its neutral position against the force urging control member 60 to one side. This means that no flexibility exists between the oil routes, and the steering has no free play in it in the sense that motion of the steering wheel within a certain range results in no corresponding turning of the vehicle.

The orifices 70 and 71 in the second embodiment allow a limited flow between both oil routes at their delivery and suction passages. The flows are naturally generated when different resisting powers are applied to the swash plates 20A and 30B thereby acting to reduce the force urging the control member to one side 60. Accordingly, motion of the vehicle in a straight line is automatically maintained under such condition that the driver's handling of the steering is done lightly or loosely, and includes some free play allowed by means of the orifices. In other words, the orifices are partly or completely operated as a differential gear system like in the prior device. Generally, the flows through the orifices may be rather limited as compared to the flows passing through the oil routes under the torque transmission.

Such degree of differential control is determined by the size opening of the orifice and the pressure level of fluid flowing through the orifice, when the abnormal load is applied to either one of the second rotors 8A and 8B. Accordingly, the size opening of the respective orifices may be determined under a design specification which takes into consideration a possible event such as slippage on a snowy road, over-handling while driving at a high speed, puncture of a tire tube, and one-sided loading.

Figures 12, 12A:
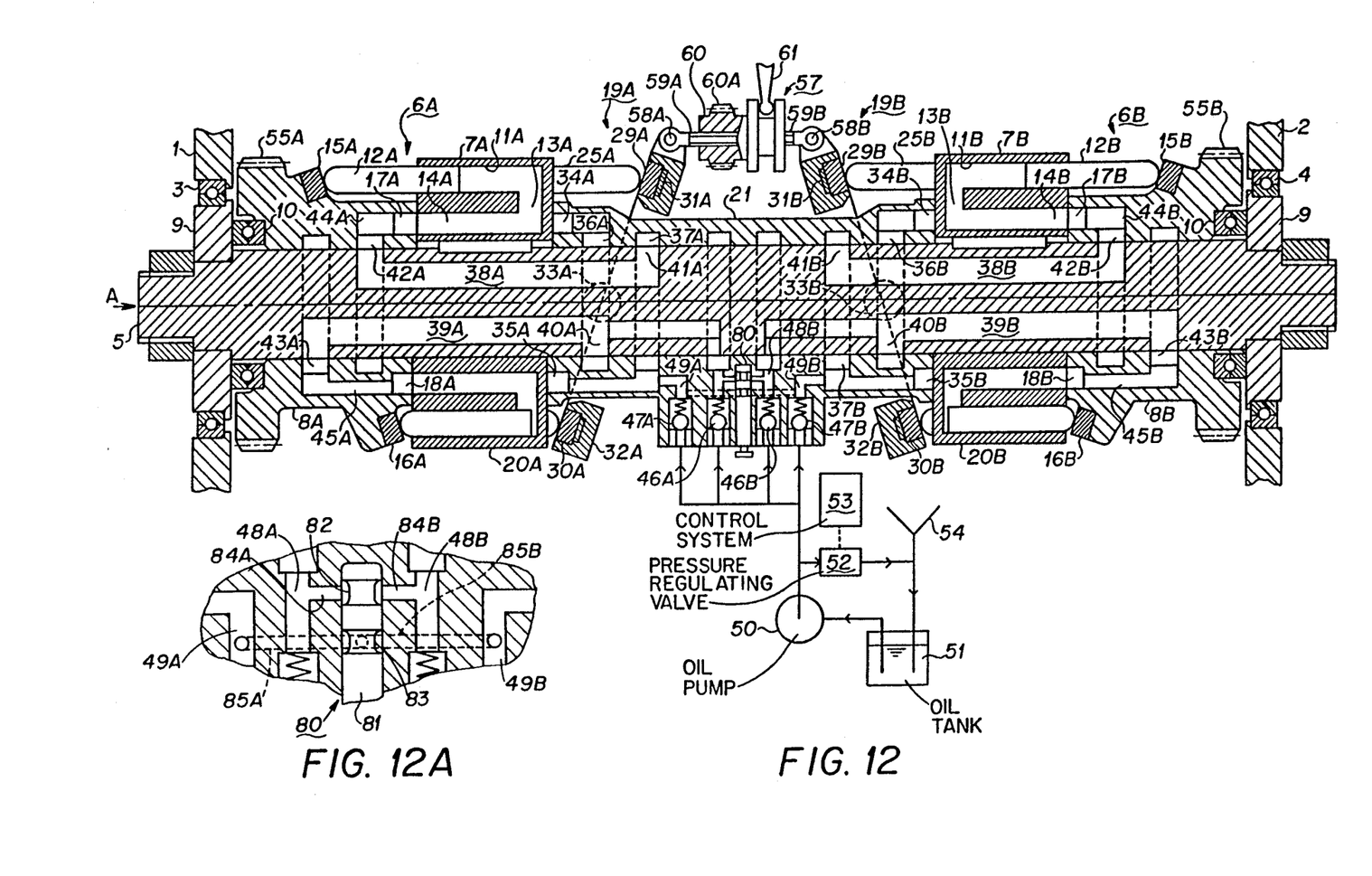
FIG. 12 is a vertical cross section of a differential rotation control device according to a third embodiment of the invention.
FIG. 12A shows an enlarged portion of FIG. 12.

A third embodiment of this invention is illustrated in FIG. 12. In this embodiment, there is provided means for regulating fluid flows between the passages 48A and 48B, and between the passages 49A and 49B, respectively, as used instead of the orifices provided in the second embodiment. The regulating means in this embodiment includes a spool valve means 80 which includes a spool member 81 with two annular grooves 82 and 83, two sets of valve ports 84A [84B] and 85A [85B] corresponding to the grooves 82 and 83, and means for handling the spool member 81 (not shown). The valve ports 84A and 84B are communicated respectively with the passages 48A and 48B, and the other valve ports 85A and 85B are communicated respectively with the passages 49A and 49B.

When the spool member 81 is shifted in its lengthwise direction, the ports 84A and 84B are mutually passed through the groove 82, and the other ports 85A and 85B are mutually passed through the groove 83. The size of the passage provided by grooves 82 and 83 can be varied from a closed condition to a completely open condition by controlling the stroke of spool member 81.

This regulating means is available to enable a slight adjustment of the design specification as mentioned above in connection with the second embodiment, some free play in the steering applied to a possible event as mentioned in the second embodiment, and regulation applied to the other drive modes such as, for example, to maintain motion of the vehicle at high-speed in a straight line or a constant curved line with its slight cornering or steering operation on a good asphalt road, in the case where the steering includes free play enabled by the opening of the valve. Another example is to maintain low-speed motion on a rough surface such as cultivated land, in the case where the driver fully handles the steering under a condition having no flexibility by the close of the valve in order to maintain the desired driving line.

Although specific embodiments of the invention have been described in detail above, various modifications thereof will be readily apparent to one with ordinary skill in the art. All such modifications are intended to fall within the scope of the invention as defined by the following claims.

What is claimed is:

1. A differential rotation control device with a hydraulic assembly, comprising:

two torque transmission assemblies (6A, 6B) respectively including first rotors (7A, 7B) with means (12A, 12B) driven by a pump and second rotors (8A, 8B) with means (16A, 16B) for receiving torque power from the first rotors when hydraulic power is applied to said pump-driven means, the first rotors being fixed on a common shaft (5) and the second rotors being mounted on and rotatable relative to said common shaft, the common shaft being a power input shaft and the second rotors being power output members, and said second rotors having rotor inlet ports (18A, 18B) receiving fluid to be pumped and rotor outlet ports (17A, 17B) discharging pumped fluid, respectively;

two pump assemblies (19A, 19B), corresponding respectively to said two torque transmission assemblies, each of which includes pump rotors (20A, 20B) with means (25A, 25B) driven by pump-driving means (30A, 30B) for pumping said pump-driven means, said pump rotors being fixed to said common shaft (5), and said pump-driving means regulating a delivery amount of fluid to be pumped as the pump rotors are rotated;

two fluid circulation routes which respectively include pump inlet ports (34A, 34B) and pump outlet ports (35A, 35B) and through which the respective pumps of the pump assemblies communicate with the corresponding pump-driven means of the respective torque transmission assemblies;

means (57) for regulating fluid supplied to the pump-driven means when the drive shaft is rotated relative to a pump-stator to which said pump-driving means is secured;

control means for applying different control ratios between the amount of fluid supplied to the pump-driving means of the pump assemblies; and two orifices (70, 71) formed in the interior of the stator (21) so that one orifice (70) communicates between respective passages (48A, 48B) in said two torque transmission assemblies, and the other orifice (71) communicates between respective passages (49A, 49B) in said two pump assemblies.

2. A differential rotation control device with a hydraulic assembly, comprising:

two torque transmission assemblies (6A, 6B) respectively including first rotors (7A, 7B) with means (12A, 12B) driven by a pump and second rotors (8A, 8B) with means (16A, 16B) for receiving torque power from the first rotors when hydraulic power is applied to said pump-driven means, the first rotors being fixed on a common shaft (5) and the second rotors being mounted on and rotatable relative to said common shaft, the common shaft being a power input shaft and the second rotors being power output members, and said second rotors having rotor inlet ports (18A, 18B) receiving fluid to be pumped and rotor outlet ports (17A, 17B) discharging pumping fluid, respectively;

two pump assemblies (19A, 19B), corresponding respectively to said two torque transmission assemblies, each of which includes pump rotors (20A, 20B) with means (25A, 25B) driven by pump-driving means (30A, 30B) for pumping said pump-driven means, said pump rotors being fixed to said common shaft (5), and said pump-driving means regulating a delivery amount of fluid to be pumped as the pump rotors are rotated;

two fluid circulation routes which respectively include pump inlet ports (34A, 34B) and pump outlet ports (35A, 35B) and through which the respective pumps of the pump assemblies communicate with the corresponding pump-driven means of the respective torque transmission assemblies;

means (57) for regulating fluid supplied to the pump-driven means when the drive shaft is rotated relative to a pump-stator to which said pump-driving means is secured;

control means for applying different control ratios between the amount of fluid supplied to the pump-driving means of the pump assemblies; and means (80) including a valve spool member (81) having two valve grooves (82, 83) corresponding to first valve ports (84A, 84B) and second valve ports (85A, 85B) respectively, said first valve ports communicating with said pump inlet port (34A, 34B) of one of said fluid circulation routes, and said second valve ports communicating with said pump outlet port (35A, 35B) of the other of said two fluid circulation routes, and said valve spool member having adjusting means to control fluid flow through the respective valve grooves.

* * * * *